Aug. 29, 1933.   W. R. GRISWOLD   1,925,071
INTERNAL COMBUSTION ENGINE
Filed Feb. 21, 1930   2 Sheets-Sheet 1
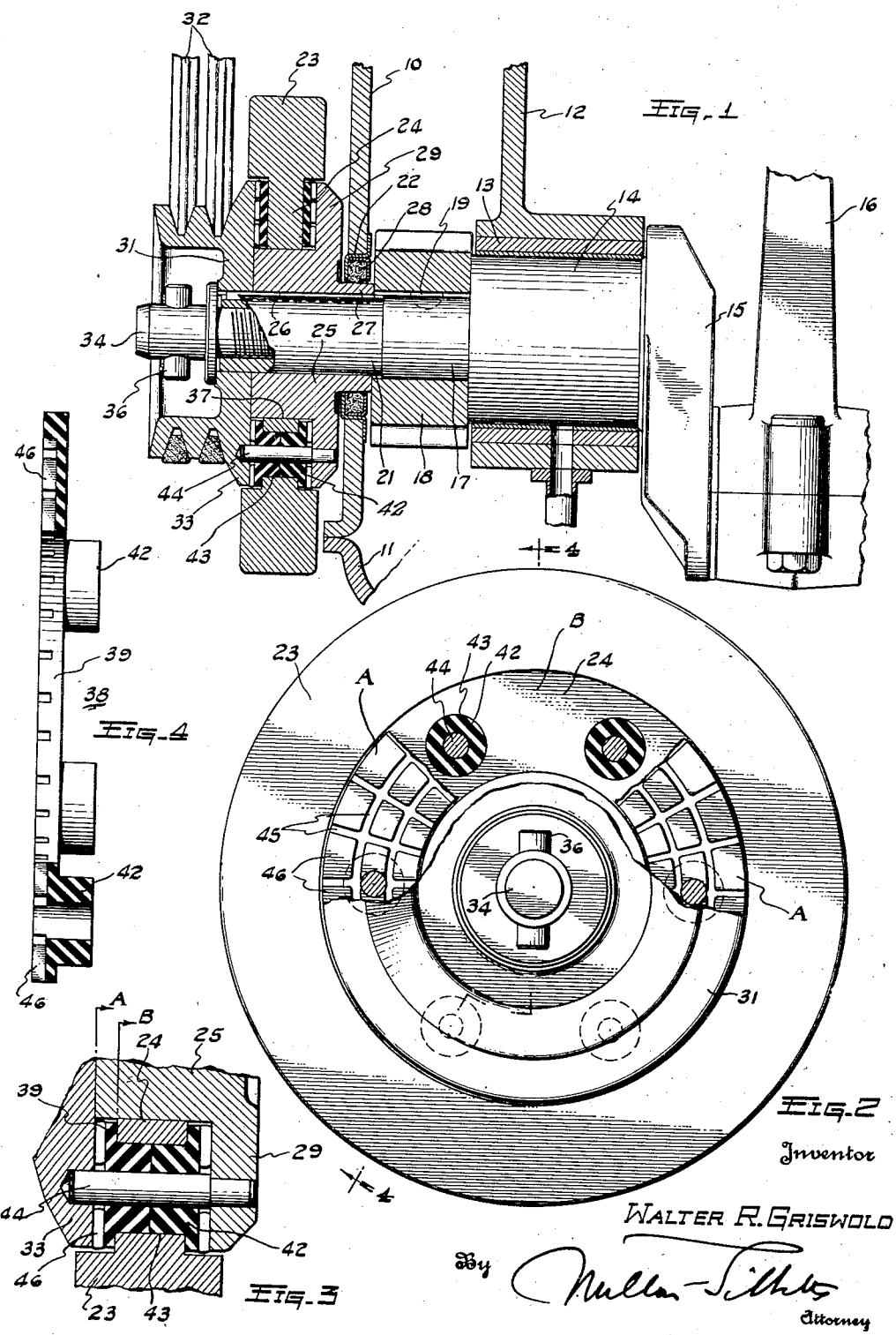

Aug. 29, 1933.  W. R. GRISWOLD  1,925,071
INTERNAL COMBUSTION ENGINE
Filed Feb. 21, 1930  2 Sheets-Sheet 2
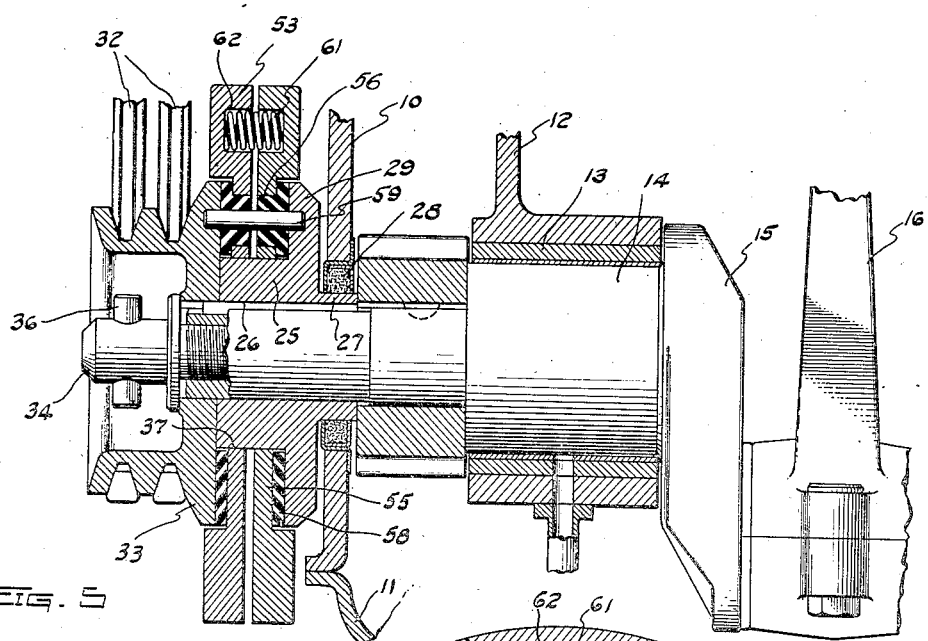
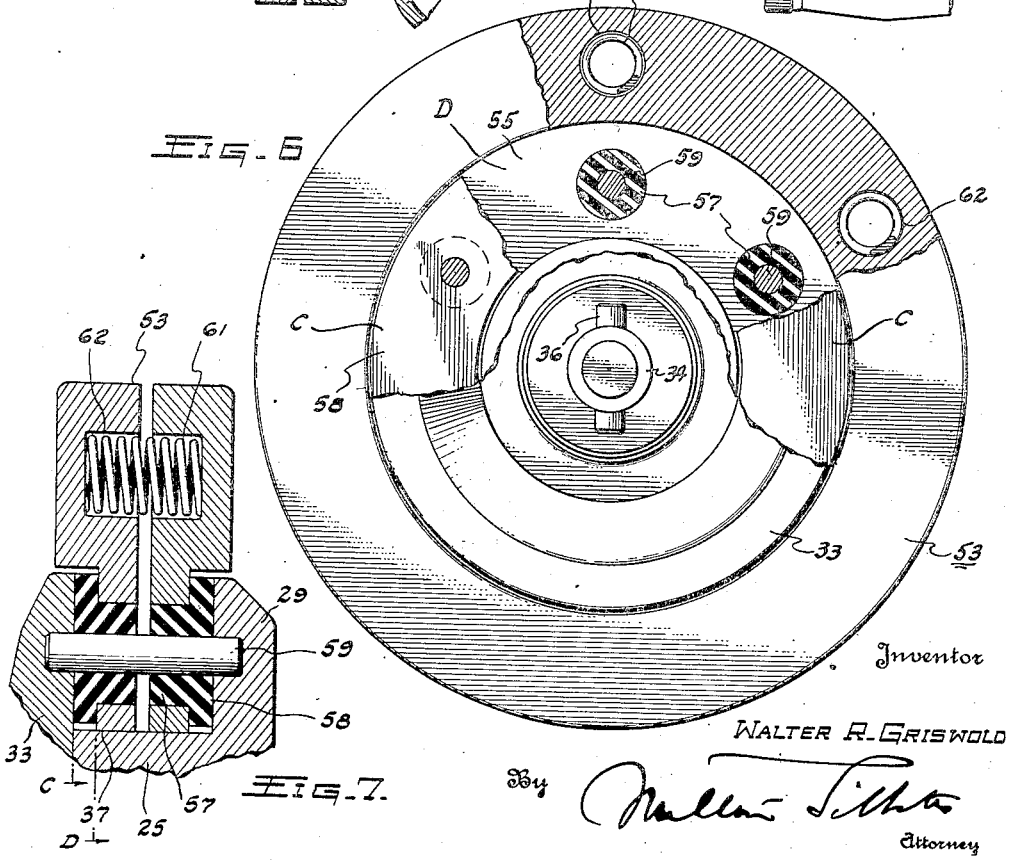
Inventor
WALTER R. GRISWOLD
By
Attorney Patented Aug. 29, 1933

1,925,071

UNITED STATES PATENT OFFICE 1,925,071

INTERNAL COMBUSTION ENGINE

Walter R. Griswold, Detroit, Mich., assignor to Packard Motor Car Company, Detroit, Mich., a corporation of Michigan Application February 21, 1930. Serial No. 430,208

10 Claims. (Cl. 74—6)

This invention relates to internal combustion engines and more particularly to means for controlling torsional vibration in the crank shafts of such engines.

It has for one of its objects to provide a simple and effective damping device in which the damping effect is independent of fine and accurate adjustment of the damper parts, and in which tuning is unnecessary.

Another object of the invention is to provide a vibration damper which may be quickly and inexpensively constructed within ordinary limits of manufacturing accuracy, and which may be easily assembled and installed with ordinary tools.

Another object of the invention is to provide a vibration damper having a deformable damping member operable under an initial compression, with means for distributing and limiting such compression.

A further object of the invention is to provide such a damper in which variations in compression caused by manufacturing variations in size, shall not be operable to materially alter the damping effect.

Other objects of the invention will appear from the following description taken in connection with the drawings, which form a part of this specification, and in which:

Fig. 1 is a longitudinal vertical section through part of an internal combustion engine provided with a vibration damper constituted in accordance with this invention;

Fig. 2 is a view to a larger scale in front elevation and partially broken away in several sections, which are taken on planes designated by reference letters in Fig. 3;

Fig. 3 is an enlarged detail section of part of the vibration damper shown in Figs. 1 and 2, taken substantially on the line 3—3 of Fig. 2;

Fig. 4 is a section through one of the deformable damping members in its free and uncompressed state, taken substantially on the line 4—4 of Fig. 2, and Figs. 5, 6 and 7 are views corresponding respectively to Figs. 1, 2 and 3, showing another form of the device.

Referring to the drawings, in Fig. 1 at 10 is represented the crank case of an internal combustion engine, having a lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawing, but are of usual construction.

Forwardly of the first bearing 13, the crank shaft 14 is preferably formed with a reduced portion 17, on which a gear or chain sprocket 18 may be keyed or otherwise secured as indicated at 19, and used to drive the engine cam shaft or other engine accessories, which are not shown in the drawings. Forwardly of the sprocket 18, the crank shaft is preferably further reduced in section as shown at 21, and projects through a suitable opening 22 in the front wall of the crank case 10.

The damping means of this invention is illustrated as mounted at or adjacent the end of the crank shaft 14. It is in the form of an annular inertia member 23, having a flanged portion 24 disposed radially inwardly, by which it is mounted coaxially with the crank shaft on a suitable part thereof. As shown, this part is the reduced portion 21 of the crank shaft 14, on which a bearing and retaining member 25 is keyed as indicated at 26. This bearing member is provided with an axial projection 27 which extends through the opening 22 in the crank case into engagement with the gear 18 to position the member axially in one direction, and cooperates with a packing device 28 mounted in the opening 22, to prevent the leakage of lubricant from the crank case and the ingress of dirt thereto. The bearing member is also provided with a radially disposed flange portion 29 adjacent the extension 27.

On the other side of the bearing member 25 there is a retaining member 31, which is also keyed to the crank shaft portion 21, as illustrated, and which may be a pulley, adapted to drive the engine cooling fan, or other engine accessories (not shown) through belts 32. The retaining member 31 is provided with a radial flange portion 33 which is oppositely disposed to the flange 29 of the bearing member 25. This member 31, and with it the members 25 and 18, may be retained on the shaft 14 by a member 34 in the form of a nut threaded to the end of the shaft portion 21, and formed with suitable teeth or lugs 36 for engagement with the usual hand starting crank for manually rotating the crank shaft for starting.

The flange 24 of the inertia member 23 may, if desired, be journaled on a bearing portion 37 of the member 25. It is disposed between the flanges 29 and 31 and is spaced from these flanges by resilient elastically deformable members 38, which are preferably formed of rubber or other suitable material having considerable internal friction or hysteresis. Each of the members 38 comprise a spacing member or flange 39 on one side of which is formed an annular row of spaced cylindrical bosses or knobs 42 integral with the ring 39, which project axially into suitable bores or recesses 43 formed in the flange member 24. These members are oppositely disposed so that the free ends of each pair of the bosses 42 are in juxtaposition, and may be in abutting relation if desired. These rubber members 38 are adapted to be axially compressed between the flanges 29 and 33, the amount of such axial compression depending on the thickness of the damping elements and the axial length of the member 25.

The members 38 are connected to the flange members 29 and 33 by axially disposed pins 44, one of which pins extends through each pair of the bosses 42 and is seated at its ends in suitable coaxial holes in the flanges, as clearly shown in Figs. 1 and 3.

From the device as thus described, it will be seen that upon the occurrence of a torsional vibration in the crank shaft, the inertia member 23, because of its inertia, is unable to follow the high frequency oscillation which is superposed on the normal forward relation of the crank shaft, and this lag of the inertia member causes a relative oscillatory movement between the shaft and the inertia member. Because of this movement, those portions of the elastic members 38 which surround the pins 44, together with those portions which are adjacent the flanges 29 and 33, will be urged to oscillate with the flanges, which are secured to and oscillate with the shaft. On the other hand, those portions of the members 38 which are adjacent the inertia member flange 24, together with those portions of the bosses 42 which project into the recesses 43, will be urged to oscillate in unison with the inertia member 23.

It will be evident, therefore, that these movements will cause distortion of the rubber members 38, and particularly of the bosses 42 thereof, different portions of these members being subjected to forces which act in different directions. Such distortion, as is well known, produces internal or molecular friction in the distorted members 38, causing a loss of energy by hysteresis which takes vibratory energy from the crank shaft at a rate sufficient to prevent the resonant growth thereof. At the same time, the elastic force of the distorted rubber members is exerted on the inertia member in opposition to the relative movement thereof, and tends always to return the inertia member to its neutral position with respect to the crank shaft.

The resistance of the rubber members to distortion, or their stiffness, depends largely upon the initial compression to which they are subjected, these members being considerably stiffer when highly compressed. As previously explained, the initial compression depends largely upon the thickness of the members 38 as manufactured and the axial length of the member 25, the end of this member forming a stop for the clamping member 31 and limiting the amount of clamping action obtainable between the flanges 29 and 33. The extent of such axial compression has a marked effect upon damping performance and it has been found in tests on dampers of this type that a variation of a thousandth of an inch would distinguish an efficient damper from a hopelessly ineffective one. Such dampers, therefore, require precision work to close limits during manufacture, and the most delicate adjustment or tuning upon assembly and subsequently in use, which greatly increases the cost of dampers of this nature and changes them from practical commercial apparatus to expensive and delicate laboratory instruments.

To obviate this difficulty the present invention provides means whereby variations in the size of the damper parts within ordinary commercial limits will have but little effect on the compression of the rubber members, so that the resulting change in the damping effect is inappreciable. To this end those faces of the rubber rings or flanges 39 which cooperate with the flanges 29 and 33 respectively are preferably grooved on radial and circumferential lines, as clearly indicated at 45 in Fig. 2, which provides the flanges 39 with a mat surface having raised or projecting portions or blocks 46, which are integral with the flanges 39 and are evenly distributed over the face thereof. Each of these projections constitutes in itself a resilient member or spring which is arranged in series with the main body of the rubber member 38 as regards axial compression. Because of their lesser cross section, and more particularly their lack of lateral support, these projections, although formed of the same material and integral with the main body of rubber, are of lesser stiffness and are more easily deformable. That is, they constitute resilient elements having a lesser rate of action than that of the main rubber member, and yield axially under less pressure. By reason of this construction, small variations in the axial distance between the opposed faces of the flanges 29 and 33 result in a greater or lesser compression or deformation of the projections 46, which simply flatten out into the groove 45 as indicated in Fig. 3 without increasing to any appreciable extent the compression of the rubber members 38 as a whole. In this way they act as limiting means for the compression of the damping members and permit variations in the dimensions of the damper parts within ordinary commercial limits without appreciably affecting the damping effect thereof.

In Figs. 5, 6 and 7 is illustrated another form of the device. In this embodiment of the invention, the inertia member 53 is formed in two parts or halves, symmetrical about a plane normal to the crank shaft axis, and these parts are separated axially a slight amount as clearly shown in Figs. 5 and 7. These parts of the inertia member are adapted to oscillate in unison, and each is provided with an integral flange portion 55 having a circumferential row of spaced recesses 56, the corresponding recesses of the two flanges being axially aligned. These recesses are adapted to receive the cylindrical knobs or bosses 57 of rubber damping members 58, similar to the members 38 shown in Figs. 1 and 3. Through each such aligned pair of bosses 57 a pin 59 is passed, the ends of these pins being seated in aligned holes in the flanges 29 and 33, as previously described. The faces of the rubber members 58 which are in contact with the faces of the flanges 29 and 33, however, are plain and smooth, not being provided with projections such as the projections 46 of the form of the invention previously described.

In the present embodiment of the invention, variations in the compressive force on the damper members 57, such as is caused by manufacturing variations in the dimensions of the device, are compensated by means of another form. As illustrated, this comprises a number of resilient elements such as light coil springs 61, arranged between the parts of the inertia member 53, the ends of these springs being preferably seated in aligned recesses 62 in the rim portions of the inertia member. These springs 61 have a rate of action less than that of the rubber damping members 58, and it will be readily understood that since the springs are in series with the damping members as regards axial compression, any variation in the compressive force between the flanges 29 and 33 will be taken up by these springs, without affecting the resistance to deformation, and the damping effect of the main damping members.

From the foregoing description it will be apparent that this invention provides an effective and reliable damper, so constructed that it may be easily and inexpensively manufactured by usual methods and machines to ordinary limits of accuracy, in which the damping effect is practically independent of variations in size of the damper part within such limits, and which may be handled and assembled on the shaft as a unit without careful adjustment.

It will be understood that various forms of the invention other than those described above may be used without departing from the spirit or scope of the invention.

Having thus described the invention, what is claimed and desired to be secured by Letters Patent is:

1. A vibration damper for shafts comprising an inertia member, a shaft member, and deformable damping means resiliently connecting said members and having an integral spacing flange therebetween, said flange having projecting portions distributed over its surface and in contact with one of said members.

2. A vibration damper for shafts comprising an inertia member, a shaft member, and deformable damping means resiliently connecting said members and having an integral spacing flange therebetween, said flange having one of its surfaces grooved to decrease its resistance to axial compression.

3. A vibration damper for shafts comprising an inertia member, a shaft member, and deformable damping means resiliently connecting said members and having an integral spacing flange therebetween, said flange having a plurality of integral axially disposed bosses each having a lower rate of action in axial compression than the main body of the damping means.

4. A vibration damper for shafts comprising shaft members having parallel radial surfaces, an inertia member having a radial flange disposed between said surfaces, deformable damping means connected to said shaft members and to said radial flange and having spacing flanges between the inertia member and said radial surfaces, and raised blocks integral with said flanges and spaced over the surface thereof in contact with the radial surfaces.

5. A vibration damper for shafts comprising shaft members having radial surfaces, an inertia member having a radial flange disposed between said surfaces, deformable damping means compressibly disposed between said shaft members and connected thereto and to said radial flange, and means integral with said damping means to limit the compression thereof.

6. In a vibration damper including relatively movable shaft and inertia members, the combination with an elastic compressible damping member forming a connection between said first named members, of yieldable means having less resistance to compression than said elastic member and arranged in series therewith as regards compression, whereby upon compression of said elastic member and said yieldable means the degree of compression of the former will be limited by the latter.

7. In a vibration damper including relatively movable shaft and inertia members, the combination with an elastic compressible damping member composed of rubber and forming a connection between said first named members, of yieldable means having less resistance to compression than said elastic member and arranged in series therewith as regards compression, whereby upon compression of said elastic member and said yieldable means the degree of compression of the former will be limited by the latter.

8. In a vibration damper for shafts, the combination with a pair of shaft carried members, of inertia means supported for oscillatory movement about the axis of the shaft, an elastic damping member forming a connection between said inertia means and said shaft carried members, said elastic member being compressible axially of the shaft between said shaft carried members, and yieldable means having less resistance to compression than said elastic member and arranged in series therewith as regards axial compression, whereby upon compression of said elastic member and said yieldable means the degree of compression of the former will be limited by the latter.

9. In a vibration damper for shafts, the combination with a pair of shaft members having opposed radial surfaces, of an inertia member having a radial flange disposed between said surfaces, an elastic damping means composed of rubber forming a connection between said shaft and inertia members and compressible axially of the shaft between said flange and said surfaces, and yieldable means having less resistance to compression than said elastic means and arranged in series therewith as regards compression whereby upon compression of said elastic means and said yieldable means the degree of compression of the former will be limited by the latter.

10. In a vibration damper for shafts, the combination with a pair of shaft members having opposed radial surfaces, of an inertia member having a radial flange disposed between said surfaces, said inertia member comprising two axially spaced parts, an elastic damping means composed of rubber forming a connection between said shaft and inertia members and compressible axially of the shaft between said flange and said surfaces, and yieldable means having less resistance to compression than said elastic means disposed between the said parts of the inertia member and acting in series with said elastic means as regards compression, whereby upon compression of said elastic means and said yieldable means the degree of compression of the former will be limited by the latter.

W. R. GRISWOLD.